INVENTORS: A. E. BACHELET
R. O. SOFFEL
BY N. S. Ewing
ATTORNEY

Dec. 7, 1954 A. E. BACHELET ET AL 2,696,529

VOICE-OPERATED SWITCHING SYSTEM

Filed Sept. 2, 1950 3 Sheets-Sheet 2

INVENTORS: A. E. BACHELET
R. O. SOFFEL
BY N. S. Ewing
ATTORNEY

INVENTORS: A. E. BACHELET
R. O. SOFFEL
BY N. S. Ewing
ATTORNEY 2,696,529

VOICE-OPERATED SWITCHING SYSTEM

Albert E. Bachelet, New York, and Robert O. Soffel, Hastings-on-Hudson, N. Y., assignors to Bell Telephone Laboratories, Incorporated, New York, N. Y., a corporation of New York Application September 2, 1950, Serial No. 183,052

3 Claims. (Cl. 179—170.8)

This invention relates in general to the transmission of electrical signals and more particularly to switching arrangements for the transmission of voice signals which are primarily applicable to half-duplex systems such as utilized in mobile radio applications.

In accordance with present methods, the connection in a terminal installation of a two-wire speech transmission system to a four-wire system is usually accomplished by means of mixing pads or hybrid coils. When either of these expedients is employed, it is usually impossible to provide complete separation between the transmitting and receiving branches of the four-wire system. In those cases in which the transmitting branch is equipped with a voice-operated gain-adjusting device, incomplete separation sometimes leads to "singing."

It is therefore the broad object of this invention to provide an improved voice transmission system of the half-duplex type in which complete separation is achieved between the transmitting and receiving branches at the terminal.

A further object of this invention is to increase the speed of the switching operation from transmitting to receiving condition or vice versa, in order to prevent clipping the speech syllables each time the switch occurs.

A further object of this invention is to prevent the circuit from switching from one condition to another in the absence of voice signals.

These and other objects are realized in an improved system in accordance with the present invention for alternatively connecting either a transmitter or a receiver to a single transmission line in response to changes in the direction of the transmitted signal. The system contemplated includes an attenuator having a fixed loss which is inserted in the line, and twin amplifier-detector circuits connected to a switching circuit which responds to a differential between the signal currents derived from different sides of the attenuator to bring about the desired connection. An automatic gain-adjusting device is included in the preferred embodiments which is adapted to adjust the gain of each amplifier-detector under control of the amplifier-detector having the higher level signal.

In accordance with a particular feature of the invention, a lock-in arrangement is provided so that the switching mechanism tends to remain in one state of operation until forced to change to another by a change in direction of voice transmission.

Although this invention is useful in any application in which it is desired to connect a two-wire bidirectional transmission system to a four-wire transmission system consisting of two two-wire unidirectional circuits adapted for transmission in different directions, the embodiments described hereinafter show the connection between a bidirectional land line and a two-channel radio link, one of which is used for transmitting and one for receiving.

In one of the disclosed embodiments, the switching device comprises a non-polar relay having normally open contacts in the path of the radio transmitter and normally closed contacts in the path of the radio receiver. Operation of the non-polar relay is controlled by a polar relay which is operated in accordance with a differential between the output currents of the amplifier-detector circuits.

In certain of the disclosed embodiments, the non-polar relay is replaced by electronic devices which may comprise in these illustrations two pairs of cold-cathode diodes respectively positioned in the transmitting and receiving links of the circuit, which are so connected that only one pair at a time is current conducting.

In accordance with one form of the invention, one or the other pair of cold-cathode diodes is fired under control of the polar relay. In accordance with another disclosed form of the invention, operation of the desired pair of diodes is controlled by a double stability trigger circuit which replaces the polar relay.

The present invention, its objects and features will be better understood from a study of the attached drawings, and the detailed description hereinafter with reference thereto.

Figure 1:
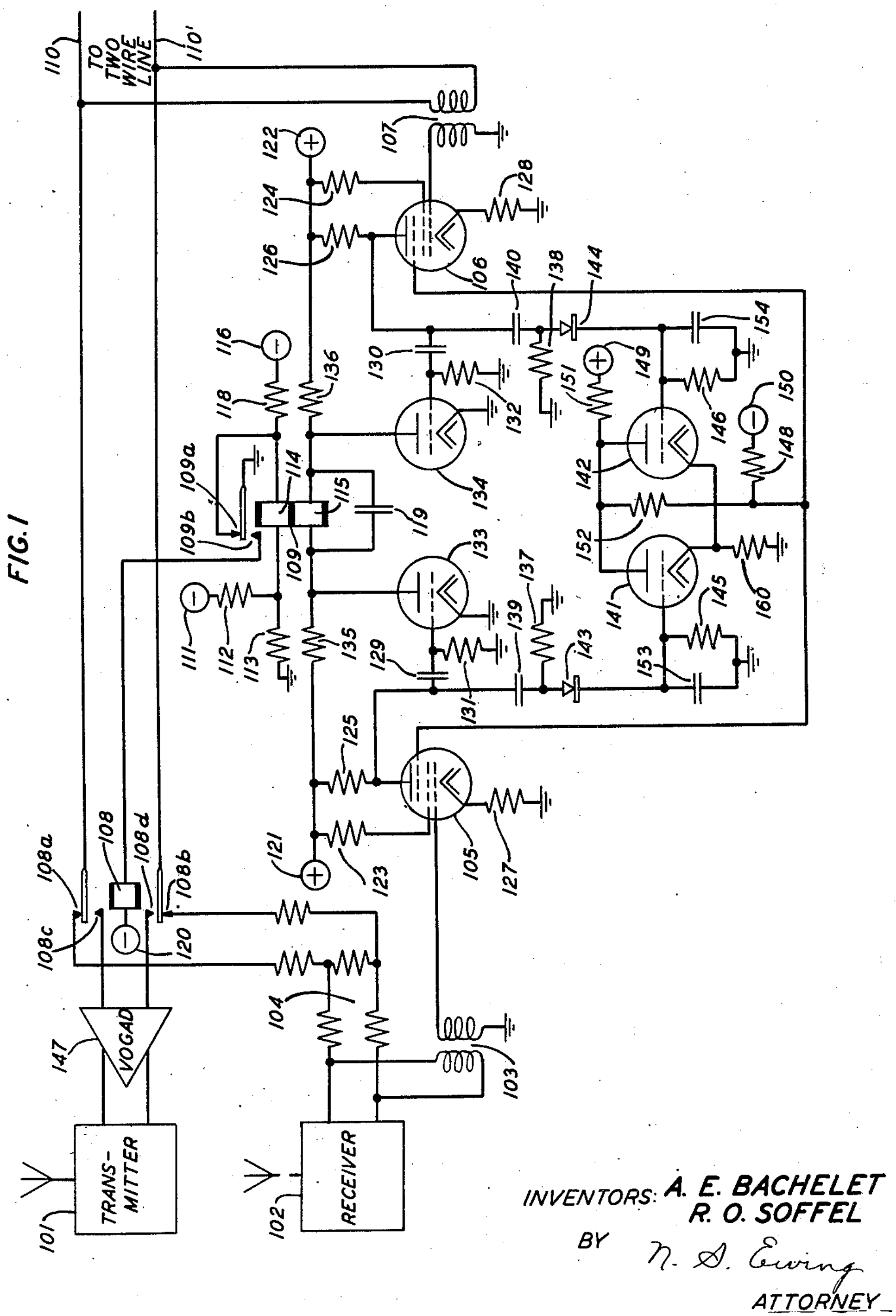
Fig. 1 shows a schematic circuit diagram of a system in accordance with the present invention in which the direction determining device, the lock-in mechanism, and the switching mechanism are all electromechanical relays and the amplifiers are operated as linear devices.

In a detailed description of the several embodiments hereinafter, the apparatus in each of the figures which perform substantially the same function are similarly designated except for the first digit which corresponds to the figure number.

A detailed description will now be given of the system illustrated in Fig. 1 in which conventional radio transmitter 101 and a conventional radio receiver 102 are alternatively connectable through a voice-operated switching mechanism contemplated in accordance with the present invention to a two-wire line leading to land installations.

This mechanism includes the conventional non-polar relay 108 having normally open contacts 108*c*, 108*d* connected to the transmitter leg of the circuit, and normally closed contacts 108*a* and 108*b* connected to the receiver leg of the circuit for controlling connection between one or the other and the two-wire line 110, 110'. The transmitting leg of the circuit includes the voice-operated gain-adjusting device 147, which may comprise a circuit such as shown and described in Patent 2,285,794 to H. L. Barney, June 9, 1942.

The energizing circuit of relay 108, which includes the battery 120, is connected to ground through the normally open contact 109*b* of the polar relay 109, structure and operation of which will be described hereinafter. The receiving leg of the circuit includes an attenuator 104 which may, for example, take the form of an H-shaped pad comprising two pairs of resistors of the order of 100 ohms in series with the line, the respective junctions of which are joined across the line by a resistor of the order of 800 ohms. The H pad is connected between output terminals of the receiver 102 and the normally closed contacts 108*a* and 108*b* of the relay 108. An alternative signal path is provided around the contacts of relay 108, which includes circuits connected to control the operation and release of the self-locking polarized relay 109. This relay, which controls the operation of normally closed contact 109*a* to ground, and normally released contact 109*b*, is a differential relay of a type well known in the art, which is wound with two opposing sets of windings 114 and 115. Two negative potential sources 111 and 116 of the order of —48 volts, are provided for the purpose of biasing and locking operated relay 109 through its upper winding 114. The negative source of potential 111 is connected to ground through a potential divider circuit consisting of the resistor 112 and the resistor 113. Negative potential source 116 is connected to ground through the resistor 118 and the normally operated contact 109*a*. One terminal of the relay winding 114 is connected between the junction of resistors 112 and 113, and its other terminal is connected to the ground terminal of resistor 118, so that current flows in such a direction as to oppose operation of the relay, when the relay is released, and to maintain operation when the relay is operated.

The two terminals of the winding 115, shunted by a capacitor 119, are respectively connected to receive the opposing output currents from the two-stage volume-controlled amplifiers on the two sides of the twin circuit. One of these amplifiers is connected to derive its input signals from the radio receiver 102 through the transformer 103 and the other of the amplifiers is connected to derive signals directly from the wire line 110, 110' through the transformer 107.

The first stages of the aforesaid twin amplifiers comprise pentodes 105, 106, the plate electrodes of which are energized from the positive terminals of sources 121, 122 through resistors 125, 126; and the screen electrodes of which are respectively energized from the same sources through resistors 123, 124. The cathodes are each connected to ground through 1000-ohm biasing resistors 127, 128 respectively; and input signals are applied to the control grids through connections from the respective secondaries of the transformers 103 and 107.

Output circuits from the plate circuits of pentodes 105, 106 are connected to the second stages in each of the amplifiers which comprise the respective triodes 133, 134, through interstage coupling circuits comprising the respective one of coupling condensers 129, 130 and grid resistors 131, 132 which are connected directly to the control grids of the aforesaid tubes 133, 134, the cathodes of which are connected directly to ground, and the plate circuits of which are connected to opposite terminals of winding 115 of the relay 109. The plate circuit in each of triodes 133, 134 receives energizing current from the respective one of positive potential sources 121, 122 through the appropriate one of resistors 135, 136.

In parallel with the output connections from the plates of pentodes 105, 106 to the grids of tubes 133, 134 is a connection to a common volume control circuit through respective interstage coupling circuits. The coupling circuits comprise series condensers 139, 140 shunted by respective grid resistors 137, 138, in series with the respective rectifiers 143, 144 to the control grid of the respective triodes 141, 142. The input circuits to the respective grids are shunted to ground through filter circuits comprising condensers 153, 154 in parallel with resistors 145, 146.

The cathodes of the tubes 141, 142 are connected together to ground through the common biasing resistor 160. A potential divider comprising resistors 151, 152 and 148 is connected between the positive terminal of potential source 149 and the negative terminal of potential source 150, common connection to the plates of tubes 141, 142 being made at the junction of resistors 151 and 152. The junction between resistors 152 and 148, which is maintained at approximately zero potential in the absence of signals, is directly connected to the suppressor grids of the respective tubes 105 and 106.

If, now, voice signals should originate from the two-wire line 110, 110', the voice waves will be applied to transformer 107, and hence the voltage developed across the secondary winding of the transformer 107 will be applied to the control grid of the vacuum tube 106.

These same voice waves originating in the two-wire line 110, 110' will also be conducted through the normally operated contacts **108*a*, 108*b* of the relay 108, and through the pad 104 to the transformer 103, the voltage developed across the secondary of which is impressed on the control grid of the vacuum tube 105**.

The amplified voice signals appearing at the plate of vacuum tube 106 are passed through the coupling condenser 140 and rectifier 144 to the control grid of vacuum tube 142. The signals developed at the plate of vacuum tube 105 are conducted over a similar path to the grid of vacuum tube 141. The filters 145—153, 146—154 serve the purpose of smoothing out the rectified speech.

Since, under the circumstances described, the direct-current signals applied to the grid of the vacuum tube 142 will be more intense than those applied to the grid of vacuum tube 141 by the amount of the loss through the pad 104, the voltage developed across the common cathode resistor 160 will be sufficiently higher than the voltage at the grid of the vacuum tube 141, so that the latter will draw no plate current. Vacuum tube 142, however, will draw plate current, and the voltage which appears at the junction of the plates of vacuum tubes 142 and 141 will be determined solely by the voltage applied to the grid of vacuum tube 142. The potential increment developed in the voltage divider comprising resistors 151, 152 and 148 is impressed on the suppressor grid of the vacuum tube 106, and on the suppressor grid of the vacuum tube 105.

When the plate current flows through the vacuum tube 142, the voltage developed at the junction of resistances 151 and 152 becomes less positive, resulting in a negative potential at the junction of resistances 152 and 148, which is impressed on the suppressor grids of vacuum tubes 105 and 106, resulting in a reduction in gain in both amplifiers. The output signals appearing at the plate of the amplifier tube 106 are also conducted through condenser 130 to the grid of the vacuum tube 134, which is normally biased to plate current saturation. The application of these signals to the grid of vacuum tube 134 therefore results in a reduction in the average plate current through this tube. Similarly, the signals from vacuum tube 105 are applied to vacuum tube 133. However, since the signals delivered to the vacuum tube 133 are lower in amplitude by the amount of the loss in pad 104, the reduction in plate current of the vacuum tube 133 is small compared to that in the vacuum tube 134, resulting in current flow from the positive pole of battery 122 through the plate load resistor 136 of the vacuum tube 134, through the winding 115 of the polarized relay 109 and through the vacuum tube 133 to ground.

The winding 115 of the relay 109 is so poled that its current tends to operate the relay 109 to engage its normally open contact **109*b*. Condenser 119 connected around the winding of the relay 109 functions to smooth the current flow through the relay. When the relay 109 breaks its normally closed contact, negative potential from the battery 116 produces current flow through the resistance 118, through the winding 114 of the relay 109, and through the voltage divider consisting of resistances 112 and 113. The winding 114 is so poled that this current tends to maintain the relay 109 operated, thus providing the lock-in feature previously mentioned. When the relay 109 operates, ground is connected through its normally open contact 109*b* to the winding of relay 108, completing the circuit to the negative terminal of the battery 120, thereby causing the relay to operate. When the relay 108 operates, it opens a circuit previously established connecting the two-wire line 110, 110' to the receiver 102, and establishes a circuit on the two-wire line 110, 110' through contacts 108*c*, 108*d* of the operated relay 108 and through the voice-operated gain-adjusting device 147 to the transmitter 101**.

The circuit will now remain in this condition until forced to change by voice signals coming from the receiver 102. When this occurs, the signal applied through the tube 105 results in the release of relay 109, ground being connected through the normally closed contact **109*a* and through the winding 114 to the aforementioned voltage divider consisting of resistances 112 and 113. Current through this circuit is in such a direction as to maintain the relay 109 released, since the signals applied to the vacuum tube 106 are now of smaller amplitude than those applied to the vacuum tube 105 by the amount of the loss in the pad 104**.

Figure 2:
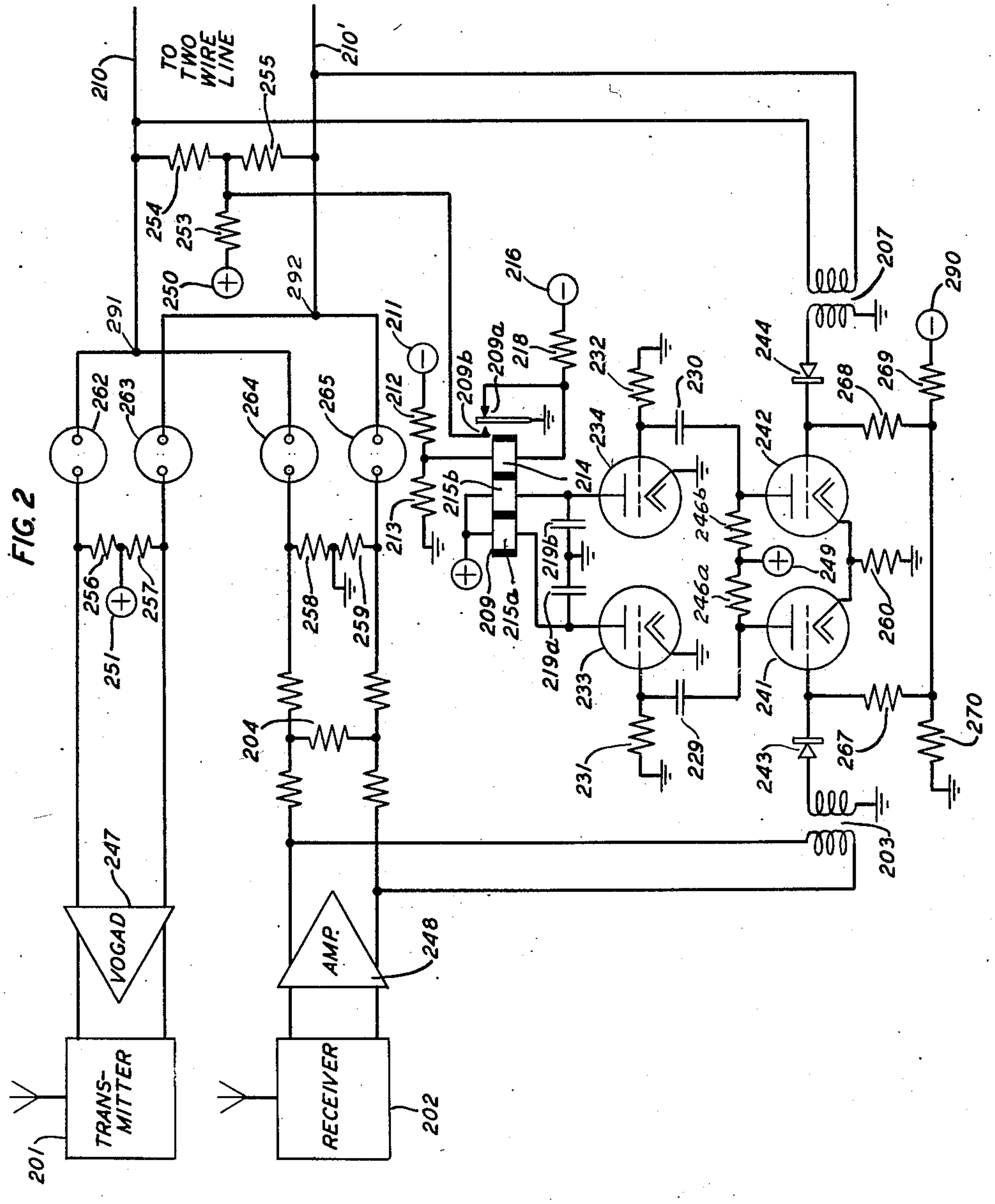
Fig. 2 shows a modification of the present invention in which the switching device is electronic, the detector and lock-in devices are electromechanical and the amplifiers are non-linear.

In an alternative embodiment of the invention, which is shown in Fig. 2 of the drawing cold cathode diodes operate to close the respective paths between transmitting and receiving links of the radio terminal and the two-wire land line, in place of the relay contacts shown in Fig. 1.

Referring in detail to Fig. 2, the receiver 202 is connected to the two-wire line 210, 210' through a path which includes the conventional signal amplifier 248 connected across its output terminals, the attenuator pad 204, and a pair of cold cathode diodes 264, 265. The diode 264 is rendered conducting through a path which includes the positive terminal of the potential source 250, resistances 253 and 254, the tube 264, and resistance 258 to ground. The tube 265 is rendered conducting over a similar path which includes resistors 255 and 259. The potential source 250 has a sufficiently high value to establish conduction in the diodes 264, 265. Values of resistors 258 and 259 are high compared to those of resistors 253, 254 and 255, so that the biasing potential appearing at the points 291 and 292 is substantially the same as that of the source 250; most of the potential drop appearing across the resistances 258, 259.

The transmitter 201 is connected to the two-wire line 210, 210′ through a path which includes the voice-operated, gain-adjusting device 247 and the cold cathode diodes 262, 263, one of which is connected in series with each line.

The positive terminal of the energizing source 251 is connected through resistor 256 to the diode 262, the current conducting path of which is completed through line 210, and resistance 254 to ground through the contact 209*b* when relay 209 is operated. Upon operation of the polarized relay 209, the diode 263 is similarly energized from the source 251 through a path which includes resistor 257.

The polarized relay 209, which has normally operated contact 209*a* to ground, and normally released contact 209*b*, is substantially similar to polarized relay 109 described with reference to Fig. 1, except for the fact that in addition to the biasing winding 214, it is provided with a pair of opposing windings 215*a* and 215*b*, across which are connected condensers 219*a* and 219*b*. When the currents in the two windings are equal no flux is produced in the relay 209 and hence it is unoperated.

The respective windings 215*a* and 215*b* of the relay 209 are separately energized from the output currents of twin two-stage volume-controlled amplifiers, which are respectively connected to the secondary of transformer 203, and the secondary of transformer 207.

From the secondary of transformer 203, connection is made through the rectifier 243 to the control grid of tube 241. Similar connection is made from the secondary of transformer 207 through rectifier 244 to the grid of tube 242. The grids of tubes 241 and 242 are respectively biased negatively through resistors 267 and 268, which are connected together to a potential divider comprising the negative terminal of source 290 and the resistors 269 and 270. As in the embodiment described with reference to Fig. 1, the common cathode resistor 260 is of sufficiently high value so that the potential across it follows the signals impressed on the grids of tubes 241 or 242. The plate circuits of these tubes, which are energized from the positive terminal of the potential source 249 through a respective one of the twin resistors 246*a*, 246*b*, are respectively connected to the grids of the tubes 233 and 234 through interstage coupling circuits comprising condensers 229, 230 and resistors 231, 232. The plate output of tube 233 is connected to the winding 215*a*, while the plate output of the tube 234 is connected to energize the corresponding winding 215*b*.

Assuming as with reference to Fig. 1, that the control relay 209 is released, disconnecting its contact to ground 209*b*, which provided a shunt path for current from the source 250, then the diodes 264 and 265 will be conducting since the potential of points 291 and 292 has been thereby rendered more positive. Accordingly, diodes 262 and 263 are rendered non-conducting, since there is insufficient voltage across them to maintain conduction, in view of the opposing positive bias provided by source 251.

Received signals traverse the following path: from the receiver 202, through amplifier 248, through pad 204, through the conducting diodes 264 and 265, and over the leads 210, 210′ of the two-wire line.

If voice signals now originate from the two-wire line they will be applied to the transformer 207, and through its secondary and the series rectifier 244, upon the grid of the vacuum tube 242. Voice signals are simultaneously applied over the leads 210, 210′ through the conducting diodes 264, 265, and through the pad 204 to the primary coil of transformer 203, and through its secondary to the grid of the vacuum tube 241. The grids of the vacuum tube 241, and 242 are normally biased to cut off. Since the signals applied to these grids are always in phase, and since, under the circumstances described, the signal of the grid impressed on the vacuum tube 241 will be of smaller amplitude than that impressed on the vacuum tube 242 by the amount of loss in the pad 204, vacuum tube 241 will draw no plate current and will produce no signals at its plate. The signals from the plate of vacuum tube 242 are conducted through condenser 230 to the grid of vacuum tube 234, which is normally biased to plate current saturation. The grid of the vacuum tube 233 is similarly biased. As pointed out above, windings 215*a* and 215*b* of the relay 209 are in opposite directions, so that when no signals are applied, the plate currents of the two tubes cancel each other and produce no flux in the relay 209. The relay 209 is maintained released by the biasing current flowing through its released contact 209*a*, and through winding 214 to the voltage divider consisting of resistances 212 and 213.

When signals are applied to the grid of vacuum tube 234, the plate current is reduced, and the undiminished plate current from the vacuum tube 233 flowing through the winding 215*a* overbalances the reduced current in winding 215*b*, causing relay 209 to operate. When the relay 209 opens its normally closed contact 209*a*, negative potential from the battery 216 causes current flow through the winding 214 of relay 209 from the aforementioned voltage divider, which current now produces a flux in the opposite direction. When the relay 209 operates, it connects ground through its normally open contact 209*b* to short-circuit the respective paths through resistance 254 and diode 264, and resistance 255 and diode 265. Since in this condition, there is no voltage across the diodes 264 and 265, they become non-conducting. Diodes 262 and 263 are accordingly rendered conducting by current from the source 251 through a path which is completed through the short-circuiting path including contact 209*b*. The transmission path is now established over leads 210, 210′ through the conducting diodes 262, 263 through the voice-operated, gain-adjusting device 247 to the transmitter 201. When voice signals arrive from the receiver 202, the above process is reversed, the transmitter disconnected from the two-wire line, and the receiver connected thereto in its stead.

Figure 3:
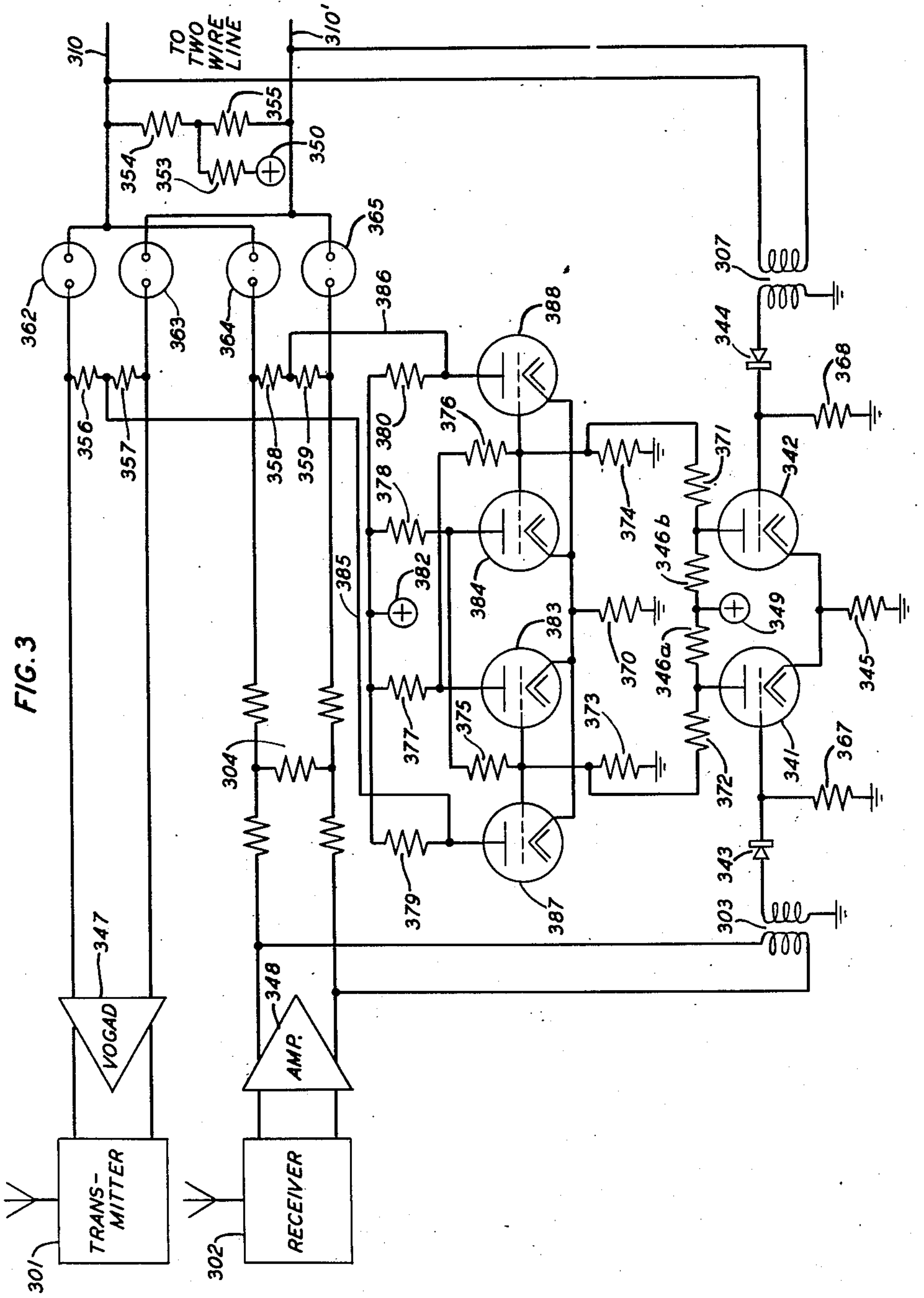
Fig. 3 shows a further modification of the invention in which all functions are performed electronically.

A third embodiment of the invention shown in Fig. 3 of the drawings includes a voice-operated switching circuit which is entirely electronic. In this circuit the polarized relay 109, 209, shown and described with reference to Figs. 1 and 2 is replaced by a double stability circuit comprising two interconnected stages in which conduction is shifted from one stage to the other in response to externally applied triggering pulses. Such circuits are well known in the art.

As in the embodiment described with reference to Fig. 2, the radio receiver 302 is connected to the two-wire land line 310, 310′ through a path which includes the cold cathode diode devices 364, 365; and the transmitter 301 is connected to the two-wire line 310, 310′ through a path which includes cold cathode diode devices 362, 363. The positive potential source 350 supplies the energizing current for all four diodes. The energizing circuit for the diode pair 362, 363 is completed through the individual resistors 356 and 357 and the common lead 385, which is connected to the plate of the amplifier 387; and the energizing circuit for the diode pair 364, 365 is similarly completed through individual resistors 358 and 359 and the common lead 386 connected to the plate at the amplifier 388.

As in the embodiment described with reference to Fig. 2, a supplementary signal path is provided between the receiver 302 and the two-wire line 310, 310′ through transformers 303 and 307, and the intervening switching circuit. The transformer secondary 303 is connected through the rectifier 343 to the grid of tube 341, across the input of which is connected the grid resistor 367. The secondary of transformer 307 is similarly connected to the grid of tube 342. The plate output terminal of tube 341 is connected to trigger tube 383 through the interstage coupling circuit which includes series resistor 372 and shunt resistor 373. Similarly the plate output terminal of tube 342 is connected to trigger tube 384 through the interstage coupling circuit which includes series resistor 371 and shunt resistor 374.

These tubes are connected together to form what is known as a bistable or double stability circuit of a type well known in the art such as referred to in the last paragraph on page 162, Chapter V of "Wave Forms," volume 19, Radiation Laboratory Series, McGraw-Hill Book Co., 1949, each of the double stability stages being connected to an output amplifier comprising one of the triodes 387, 388. The plate circuit of tube 383 is connected to the grids of tubes 384 and 388 through resistance 376; and the plate circuit of tube 384 is connected to the grids of tubes 383 and 387 through resistance 375. All four plates are energized from the common potential source 382. The plates of tubes 383 and 384 derive energizing current through the respective resistors 377 and 378, and the plates of the tubes 387 and 388 derive their energizing current through the respective resistors 379 and 380. All four cathodes are connected together to ground through the common cathode resistor 370.

Assuming that vacuum tube 384 and its associated output amplifier tube 388 are conducting, the plate of the vacuum tube 388 will accordingly be negative with respect to the positive potential of the battery 382. Diode 364, will then be rendered conducting by current flowing over the following path: from the positive potential source 350, through resistances 353 and 354, through diode 364, and through resistance 358 to the comparatively negative potential point at the plate of the vacuum tube 388. The diode 365 will be rendered conducting over a similar path. Since the vacuum tubes 383 and 387 are cut off when vacuum tube 384 is conducting, the plate of tube 387 will be maintained at the positive battery potential, and diodes 362 and 363 will be non-conducting, since there is no potential drop across them.

If voice signals now arrive from the two-wire line, they will be conducted along a path previously described with reference to Fig. 2, to the grids of vacuum tubes 341 and 342. As in the embodiment of Fig. 2, the common cathode resistor 345 is sufficiently high so that the potential across it follows the signals impressed on the grid of the vacuum tube 342. Therefore, the plate current in vacuum tube 342 increases, driving its plate negative with respect to the positive potential of battery 349. The plate current of vacuum tube 342 is conducted through resistor 371 to the grid of vacuum tube 384, driving it in a negative direction. At the same time, the rise in cathode voltage reduces the plate current in vacuum tube 341.

The positive voltage at the plate of vacuum tube 341 is impressed through resistance 372 to the grid of vacuum tube 383 driving it positive. This action causes the vacuum tube 384 to cease conducting and vacuum tube 383 to conduct. This condition will be locked in operation in accordance with the well-known principle of the double stability circuit. Since the grids of vacuum tubes 384 and 388 are connected together, plate current will cease to flow in the latter and the potential on its plate will become substantially that of the positive terminal of battery 382. This operation effectively short-circuits diodes 364 and 365, and causes them to cease conducting. Plate current will now flow in vacuum tube 387, causing its plate to be negative with respect to the positive terminal of battery 382; and diodes 362 and 363 will be rendered conducting over a path similar to that described with reference to diodes 364 and 365. Signal transmission now takes place from the two-wire line over leads 310, 310', through the conducting diodes 362 and 363, and through the voice-operated gain-adjusting device 347 to the transmitter 301. The network consisting of resistors 377, 376, 374 and 371 is so arranged that on the negative half-cycle of the signals applied to the grid of vacuum tube 342, when vacuum tubes 341 and 342 are restored to normal, the double stability circuit comprising vacuum tubes 383 and 384 is not disturbed. Resistors 378, 375, 373 and 372 comprise a similar network. When voice signals arrive from the receiver 302 the above-described process is reversed, disconnecting the transmitter and connecting the receiver to the two-wire line.

The choice of a particular one of the disclosed systems for a given application is determined by such factors as power drain, and permissible speech syllable clipping.

It will be understood that practice of this invention is not limited to the use of any element or combination of elements disclosed by way of illustration in this specification and the attached drawings; and that the principles of the present invention are capable of embodiment in other forms than those specifically disclosed herein.

What is claimed is:

1. In combination with an electrical transmission system including separate signal transmitting and receiving means, a bidirectional transmission line, and a pair of unidirectional transmission lines respectively connecting said signal transmission and signal receiving means to said bidirectional transmission line, an attenuator included in the transmission path of one of said unidirectional transmission lines, each of said unidirectional transmission lines including in the signal transmission path connecting said unidirectional line to said bidirectional line, a gas-filled electron discharge device, means comprising a source of ionizing potential connected to each of said electron discharge devices, switching means for alternatively completing circuits respectively including said source of ionizing potential and one or the other of said electron discharge device to render said devices and thereby said unidirectional transmission lines alternatively conducting and non-conducting, said switching means comprising a trigger circuit operative in either one or the other of two stable operating conditions, and detecting means respectively connected to said one unidirectional transmission line and said bidirectional transmission line on different sides of said attenuator for alternatively tripping said trigger circuit into one or the other of said stable operating conditions in response to the differential between signal currents detected by said detecting means, thereby alternatively completing the signal transmission paths between said unidirectional transmission lines and said bidirectional transmission line.

2. A system in accordance with claim 1 comprising a volume control circuit coupled to said detecting means and said trigger circuit, whereby said trigger circuit is operated in accordance with the differential between signal currents detected by said detecting means.

3. In combination with an electrical transmission system including separate signal transmitting and receiving means, a bidirectional transmission line, and a pair of unidirectional transmission lines respectively connecting said signal transmission and signal receiving means to said bidirectional transmission line, an attenuator included in the transmission path of one of said unidirectional transmission lines, each of said unidirectional transmission lines including in the signal transmission path connecting said line to said bidirectional line a gas-filled electron discharge device, means comprising a source of ionizing potential connected to each of said electron discharge devices, switching means having only two stable conditions of operation for alternatively completing circuits respectively including said source of ionizing potential and one or the other of said electron discharge devices to render said devices and thereby said unidirectional transmission lines alternatively conducting and non-conducting, said switching means biased in one condition of operation, and detecting means respectively connected to said one unidirectional transmission line and said bidirectional transmission line on different sides of said attenuator for alternatively biasing said switching means to the other said condition of operation in response to the differential between signal currents detected by said detecting means, thereby alternatively completing the signal transmission paths between said unidirectional tarnsmission lines and said bidirectional transmission line.

References Cited in the file of this patent

UNITED STATES PATENTS

| Number | Name | Date |
|---|---|---|
| 2,082,357 | Ryall | June 1, 1937 |
| 2,273,945 | Fisher | Feb. 24, 1942 |
| 2,282,403 | Herrick | May 12, 1942 |
| 2,468,552 | Herrick | Apr. 26, 1949 |
| 2,468,553 | Herrick | Apr. 26, 1949 |